Jan. 9, 1934.  A. O. JAEGER  1,942,817
CATALYTIC APPARATUS
Filed Jan. 14, 1930  2 Sheets-Sheet 1
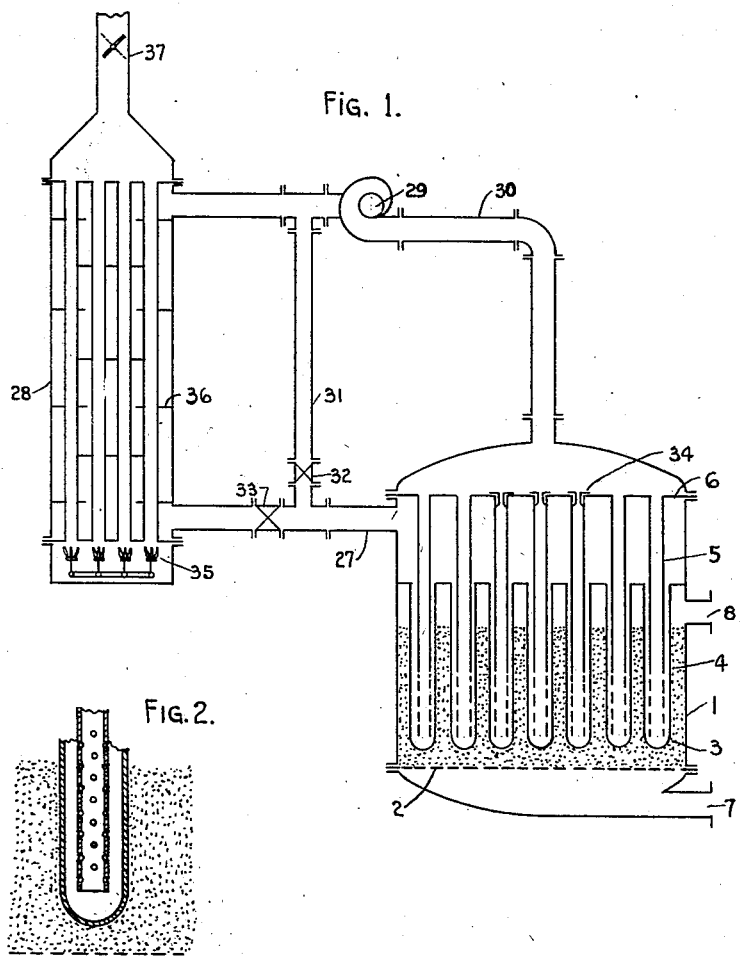
Inventor
ALPHONS O. JAEGER.
By Robert Ames Morton
Attorney Jan. 9, 1934.  A. O. JAEGER  1,942,817
CATALYTIC APPARATUS
Filed Jan. 14, 1930  2 Sheets-Sheet 2
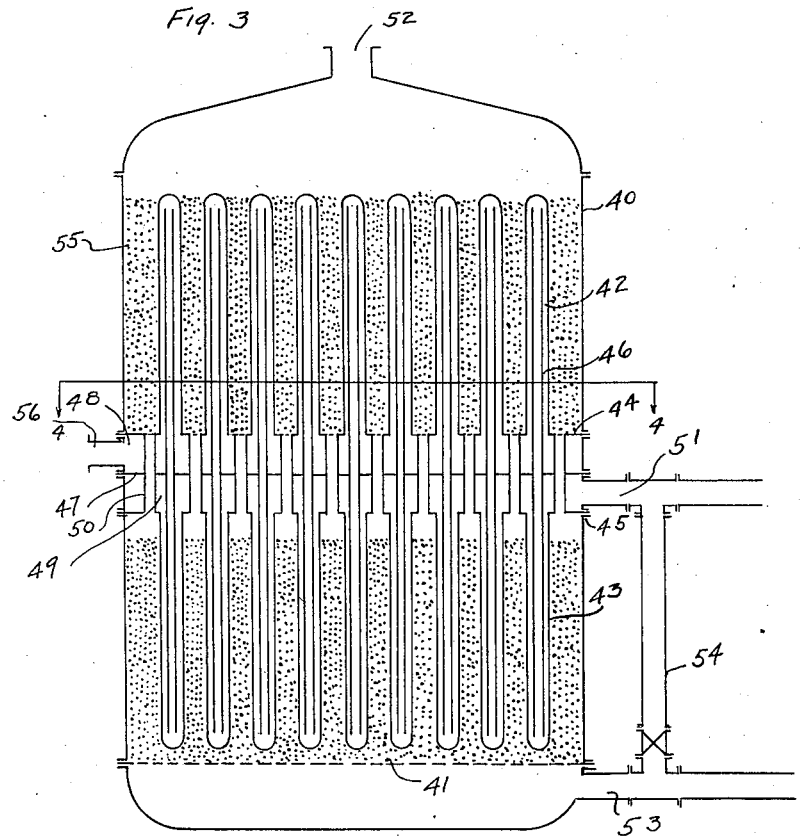
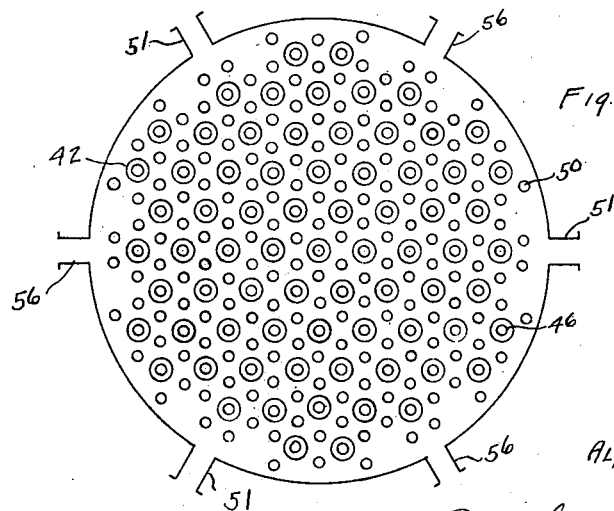
Inventor
Alphons O. Jaeger
By Robert Ames Norton
Attorney Patented Jan. 9, 1934

1,942,817

UNITED STATES PATENT OFFICE 1,942,817

CATALYTIC APPARATUS

Alphons O. Jaeger, Mount Lebanon, Pa., assignor to The Selden Company, Pittsburgh, Pa., a corporation of Delaware Application January 14, 1930. Serial No. 420,656

3 Claims. (Cl. 23—288)

This invention relates to catalytic apparatus and more particularly to catalytic apparatus for carrying out reactions which require very delicate temperature regulation.

An object of the invention is to provide a converter system using a single layer or a plurality of layers of catalyst wherein a close positive control of the temperature conditions within the catalyst is maintained at all times, both longitudinally and at right angles to the gas flow.

A further object is to maintain this positive temperature control by outside cooling means, independent of variations in temperature or of flow of the reaction mixture.

A still further object is to provide such a converter system wherein this temperature control is maintained both for exothermic and endothermic reactions.

In my prior application Serial No. 327,853, filed Dec. 22, 1928, I have described converter systems in which a plurality of catalytic layers or converters are provided, the first layer or converter being cooled by the reaction gases themselves and the second layer or layers being provided with an independent cooling system. As shown in that application this independent cooling system may make use of a flow of air or other gaseous medium which is circulated in heat exchange relation with the catalyst and then through an outside heat exchanger.

The present case is a continuation in part of that application and relates to forms of the invention in which the outside cooling is used per se, and to some of the more specific details of such a system. The invention is particularly effective in carrying out vapor phase reactions in which a close control of the temperature throughout all portions of the catalyst bed is necessary. It presents the advantages of a very simple converter structure in which the heat exchange elements do not in all cases need to be gas tight and which is capable of very close temperature control together with the simplicity of operation resulting from the use of a single layer of catalyst.

The catalytic apparatus of the present invention may be used for the most various vapor phase catalyses, such as:—the oxidation of benzol, toluol, phenol, tar phenols or furfural to maleic acid and fumaric acid; cresol to salicylaldehyde and salicyclic acid; toluol and the various halogen and nitro substituted toluols to the corresponding aldehydes and acids; xylenes, psuedocumene, mesitylene, paracymene and other derivatives to the corresponding aldehydes and acids; naphthalene to alphanaphthaquinone, phthalic anhydride and maleic acid; phthalic anhydride to maleic acid and fumaric acid; anthracene to anthraquinone; phenanthrene to phenanthraquinone, phthalic anhydride and maleic acid; acenaphthene to acenaphthylene, acenaphthaquinone, bisacenaphthylidenedione, naphthaldehydic acid, naphthalic anhydride and hemimellitic acid; fluorene or dehydrogenated fluorenes to fluorenone; eugenol and isoeugenol to vanillin and vanillic acid; methyl alcohol and methane to formaldehyde; ethyl alcohol to acetic acid; ethylene chlorhydrine to chloracetic acid.

Organic oxidations in which impurities are selectively burned out or transformed into easily removable substances also require accurate control; examples of such reactions are the purification of crude anthracene or phenanthrene by the selective catalytic combustion of carbazol, the purification of crude naphthalene, crude mononuclear aromatic hydrocarbons and crude aliphatic compounds, such as high sulfur oils and motor fuels.

Ammonia from coal tar may also be purified by selective oxidation of organic and other impurities and requires a good temperature control. The apparatus is also suitable for the oxidation or synthesis of ammonia, and for the oxidation of sulfur dioxide to sulfur trioxide.

The apparatus of the present invention is also suitable for other types of exothermic vapor phase catalyses, such as catalytic reductions, hydrogenations, condensations and the like, and for high pressure reactions and special reactions such as the catalytic purification of gases, catalytic water gas process, synthesis of hydrocyanic acid, production of reduction products of oxides of carbon, such as, for example, methanol, various motor fuels and the like. Examples of reductions are:—reduction of nitro compounds to amines, for instance nitro benzol to aniline, etc., the reduction of phenols to cyclohexanols, naphthalene to tetraline, etc., crotonaldehyde to normal butyl alcohol, acetaldehyde to ethyl alcohol, etc.

The apparatus is also suitable for endothermic reactions, for example splitting reactions such as the production of monocarboxylic acids from polycarboxylic acids, e. g. benzoic acid from phthalic anhydride and steam or hydrogen or carbon dioxide and hydrogen or the production of aldehydes, such as benzaldehyde from benzoic acid by catalytic reduction with carbon monoxide; dehydrations and dehydrogenations; catalytic esterifications; molecular rearrangements; and the production of methanol from carbon dioxide.

It will be seen, therefore, that the catalytic apparatus of the present invention is suited for both exothermic and endothermic vapor phase reactions and provides means whereby a very close regulation of the temperature and of the reaction kinetics may be obtained in either case. The apparatus will, therefore, not be described in connection with any particular reaction, but it is to be understood that any of the reactions enumerated above, or any other catalytic vapor phase reaction in which close temperature control is desired may be advantageously carried out therein.

The invention will be described in greater detail in connection with the drawings in which:

Fig. 1 is a vertical section through a converter system provided with an internal heat exchanger and external heating or cooling means in accordance with the present invention, and Fig. 2 is a detail of one modification of the heat exchange element design shown in Fig. 1.

Fig. 3 shows a converter designed for the use of indpendent cooling gases in combination with the reaction mixture itself.

Fig. 4 is a cross-section on the line 4—4 of Fig. 3.

It should be understood that the drawings are purely diagrammatic in nature and accessories, such as insulation, temperature measuring devices, etc., have been omitted for the sake of simplicity, but in an actual installation, of course, all such suitable details will be provided by the skilled engineer.

Referring to Fig. 1 the converter comprises a shell 1, the catalyst mass 3 resting on the screen 2. Closed-end tubes 4 extend into the catalyst and terminate above the screen 2, leaving a solid bed of catalyst between the screen and the lower ends of the tubes. Open-end tubes 5 depending from a tube sheet 6 extend substantially to the bottom of the closed-end tubes 4. The open-end tubes adjacent the center of the converter are provided with orifice plugs 34 which restrict the flow of gas in the heat exchange elements and thus provide a more even heat effect in cases where the apparatus is to be used for an endothermic reaction, since the other portions of the catalyst bed are naturally subject to loss of heat through the converter walls. It is to be understood that when the converter is to be used for an exothermic reaction the orifice plugs will be placed over the tubes near the periphery of the converter and not over those at the central portions, as shown in Fig. 4 of the application referred to. The same effect may also be obtained by varying the relative spacing, dimensioning or design of the heat exchange elements, as described in my Patent No. 1,685,672, dated September 25, 1928.

The external heating or cooling system is made up of a heat exchanger 28 which may be of any approved type and which is connected at its upper and lower portions to the converter by means of pipes 30 and 27, suitable circulation being obtained by means of the pump 29. The pipe system is supplied with a by-pass 31 and with suitable valves 32 and 33. In operation the cooling or heating medium after passing through the double countercurrent heat exchange elements in the catalyst layer flow out through pipe 27, thence through the heat exchanger 28 and is finally recirculated through the pipe 30 by means of the pump 29. In carrying out endothermic reactions it may be desirable to reverse the flow, and this is done by simply reversing the pump 29. Closer temperature control may be obtained by opening or closing the by-pass 31 by suitable adjustment of the valves 32 and 33.

In operation the reaction mixture, preheated to suitable temperature if desired, passes through the inlet 7 into the lower portion of the converter, up through the catalyst, and exits through the pipe 8. In some cases such for example as when an endothermic reaction is being carried out having a slow reaction time, it may be found desirable to circulate the reaction mixture in the opposite direction, suitably adjusting the direction of flow of the outside heating medium if necessary, and this method of operation is included as a feature of the present invention. It will be seen that with the external heating or cooling means the temperature and flow of the reaction mixture is entirely independent of the temperature and flow of the circulating heating or cooling medium and can be independently varied, both in temperature and direction, and thus a very accurate degree of control of the reaction may be exercised. It is to be understood that the temperature regulating medium may be either a liquid or a gas, or a saturated vapor may be used. In many cases it is particularly advantageous to use a circulating medium of the same nature as the reaction mixture itself or as one of the reaction components, since in this case small leaks in the tube construction within the converter do not affect the reaction.

It is well-known that in most catalytic reactions, both exothermic and endothermic, the temperature conditions in the first and last portions of the catalyst should not be the same. A zone of higher temperature should be maintained in the first portions of the catalyst, where the reaction mixture is most concentrated, in order to secure a greater speed of conversion. From this zone the temperature should drop smoothly and evenly toward the last portions as the mixture becomes more and more diluted by the reaction products. At the same time, however, the temperature in any given cross-section of the catalyst should be uniform in order to obtain the most efficient use of the catalyst at this area.

These conditions are maintained positively in the converter system of the present invention both for exothermic and endothermic reactions. In an exothermic reaction, and particularly in the vapor phase catalytic oxidation of organic compounds with air, a much greater amount of heat is generated in the first portions of the catalyst than in the latter portions, due to the more concentrated reaction mixture. It will be seen that with the double counter-current heat exchange elements of the present invention the incoming cooling gases passing through the open-end tubes are in indirect heat exchange relation with the catalyst during their passage and in direct heat exchange relation with the outgoing cooling gases. It is evident, therefore, that the greatest amount of cooling is effected where the incoming gases first come into direct heat exchange relation with the catalyst, i. e., at the bottoms of the closed-end tubes 4. This is exactly the area in which the greatest amount of heat is generated and in which the strongest cooling action is necessary, and it will, therefore, be seen that the converter system of the present invention is ideally suited to such types of reaction. The double countercurrent heat exchange elements are shown on the drawings as being rather widely spaced. In actual practice, however, they are quite close together and are evenly distributed throughout the catalyst mass. The temperature control is, therefore, uniform throughout any lateral section of the catalyst, particularly when the orifice plugs 34 are used in the manner previously described. In order to prevent localized overcooling at the bottoms of these tubes, which would result in an inefficient use of the catalyst at these points, the open tubes 5 are preferably provided with series of perforations near their lower ends, as shown in Fig. 2. The incoming cooled gases are thus permitted to diffuse into the outer tubes over a greater area, and the strongest cooling action is not concentrated at a single point.

When the converter is to be used for an endothermic reaction the flow of the heating medium and of the reaction gases is usually the same, although it may be found desirable in some cases to reverse the flow of either or both. The circulating gases are heated in the heat exchanger 28 by means of gas burners 35, an effective exchange being obtained by circulation of the gases back and forth over the baffles 36 and the flow of heating medium being regulated by adjusting the damper 37. Although the temperature conditions are reversed in an endothermic reaction, the action of the temperature regulating system is the same in controlling the temperature throughout the catalyst in accordance with the requirements of the reaction kinetic. The reaction in the first portion of the catalyst where the fresh reaction mixture meets the catalyst requires more energy than in subsequent portions of the partly reacted gases. More heat must, therefore, be supplied in this first zone and this is done in the manner previously described for the cooling gases. The gases freshly heated in the heat exchanger 28 pass through the open-end tubes 5, and come into direct heat exchange relation with the catalyst at the lower portions of the closed end tubes 4, where, because of their higher temperature, they are best suited to provide a greater amount of energy in form of heat for the reaction progressing at this area. During their subsequent passage through the outer tubes 4, they give up less and less heat to the catalyst and reacting gases, and thus a smooth reaction control is obtained without undesired decomposition of the reaction products. It will be seen, therefore, that for both exothermic and endothermic reactions the converter system described maintains favorable and if desired a continuously decreasing temperature gradient throughout the length of the catalyst mass and does this by means of a temperature control system which is independent of the flow of the reaction gas mixtures.

It will be appreciated that the action of an outside temperature regulating system can be supplemented, if desired, by the action of the reaction mixture itself, either before or after its passage through the converter. An example of a converter of this type is shown in the modification of Figures 3 and 4.

In this modification the catalyst 55 is retained within the converter shell 40 upon the retaining screen 41 in the usual manner. Complementary sets of closed-end tubes 42 and 43, which are preferably uniformly spaced throughout the catalyst mass, are mounted into tube sheets 44 and 45. Centrally located within these closed-end tubes are open-end tubes 46, mounted in the central tube sheet 47 and if desired provided with suitable spacers to keep them centrally located within the outer tubes. The central tube sheet 47 also serves to divide the space between the upper and lower tube sheets into two separate compartments 48 and 49. Within the central tube sheet 47 are also mounted tubes 50 which serve to conduct the reaction mixture from the upper to the lower part of the converter. These tubes are headed into the upper and lower tube sheets 44 and 45 in the usual manner.

The temperature regulating gases, which may or may not contain a portion of the converter product or of the original reaction mixture, enter at 51 and pass downwardly through the closed-end tubes 43 in direct heat exchange relation with the catalyst. After passing through the inner tubes 46 they again come into direct heat exchange relation with the catalyst at the upper portions of the closed-end tubes 42 and after passing through these leave the converter at 56. It is to be understood that all or a portion of these temperature regulating gases may be recirculated through an outside temperature regulating system such as that shown in Figure 1, with or without the removal of reaction products or other constituents thereof. The reaction mixture enters the converter at 52 and leaves at 53 all or a portion of the converter product being passed through the by-pass 54 and through the heat exchangers if desired. It is also possible to introduce a portion of the untreated reaction mixture into the heat exchangers by means of a by-pass not shown on the drawings if this should prove to be desirable.

It will be noted from Fig. 4 that the converter shell 40 is provided with a plurality of entrances and exits for the temperature regulating gases. It will usually be found desirable to provide bustle pipes surrounding the converter shell in order to obtain a more uniform admission of the temperature regulating gases, but such mixing means form no part of the present invention and have been omitted for the sake of clearness. The catalyst mass 55 has also been shown in the customary manner by stippling, but it is to be understood that the invention is not limited to a granular catalyst and any suitable type of catalytic mass may be used.

What is claimed as new is:

1. A method of regulating the temperature conditions within a stationary layer of catalyst mass which comprises cyclically circulating a temperature regulating medium first in indirect and then in direct heat exchange relation with the interior of the catalyst mass and then through an outside heat exchange system.

2. The method of effecting catalytic reactions which comprises passing a reaction mixture through a stationary layer of catalyst mass and simultaneously maintaining a circulation of a temperature regulating medium first in indirect and then in direct heat exchange relation with interior portions of the catalyst layer but out of contact therewith and then through an outside heat exchange system, the flow of said temperature regulating medium being independent of the flow of the reaction mixture.

3. A catalytic apparatus comprising a stationary catalyst mass, a plurality of heat exchange elements within said catalyst mass and provided with means for causing the flow of a temperature regulating medium to pass in indirect and then in direct heat exchanging relation with said catalyst mass, an outside temperature regulating system, and means for cyclically circulating the temperature regulating medium through said heat exchange element and through said outside temperature regulating system.

ALPHONS O. JAEGER.